Dec. 3, 1935. C. P. HOWARD Re. 19,775

CONTROL DEVICE FOR ALARM MECHANISM

Original Filed May 19, 1931 2 Sheets-Sheet 1

Inventor
Clifton P. Howard
By Attorneys
Smith, Gate, Fong & Hawley

Dec. 3, 1935. C. P. HOWARD Re. 19,775

CONTROL DEVICE FOR ALARM MECHANISM

Original Filed May 19, 1931 2 Sheets-Sheet 2

Inventor
Clifton P. Howard
By Attorneys
Southgate Fray & Howley

Reissued Dec. 3, 1935

Re. 19,775

UNITED STATES PATENT OFFICE 19,775

CONTROL DEVICE FOR ALARM MECHANISM

Clifton P. Howard, Worcester, Mass., assignor, by mesne assignments, to the Gamewell Company, Newton, Mass., a corporation of Massachusetts Original No. 1,891,540, dated December 20, 1932, Serial No. 538,493, May 19, 1931. Application for reissue September 8, 1934, Serial No. 743,299

30 Claims. (Cl. 200—142)

This invention relates to signal systems designed to sound an alarm upon the occurrence of excessive atmospheric temperatures in a defined area. Such systems may be installed in places where sprinklers cannot be used, or may be supplementary to the sprinkler system.

It is the general object of my invention to provide an improved control device for the alarm mechanism of such signal systems, so designed that the control device will be reliably responsive to excessive atmospheric temperatures.

A further object of the invention is to provide a control device which may be assembled on a cover plate for an ordinary junction box, such as is commonly used in electric wiring installations.

I also provide a modified construction which is adapted for installations where head room is limited.

My invention further relates to arrangements and combinations of parts which will be hereinafter described and more particularly pointed out in the appended claims.

Two forms of the invention are shown in the drawings, in which

Figure 1:
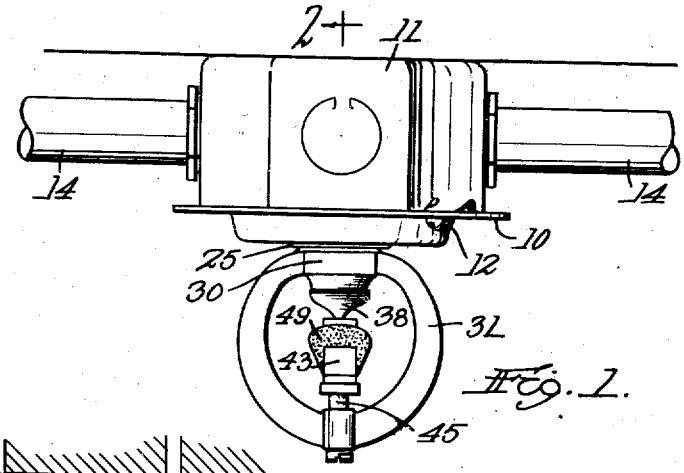
Fig. 1 is a side elevation of one form of my improved control device.

Referring to Figs. 1 to 4, I have shown my improved control device assembled on a cover plate 10, adapted to be secured to a junction box 11 by binding screws 12. The box 11 is of the usual commercial construction, and pipes or conduits 14 may be connected thereto, through which wires 15 and 16 may extend to a suitable signal device and to a source of electricity, not shown.

My improved control device, as shown in Figs. 1 to 4, comprises a ring 20 of insulating material, seated in a recessed portion 21 of the cover plate 10. A cup-shaped member 23 is mounted in the axial opening of the ring 20 and extends through an axial opening in the cover plate 10. The outer end of the cup-shaped member 23 is flanged or spun outwardly, as indicated at 25, thereby securing the ring 20, the cover plate 10 and the member 23 in permanently assembled relation and alignment.

Contact members 26 and 27 of a circuit controller are mounted on the insulating ring 20 and are connected to the wires 15 and 16 respectively. The cup-shaped member 23 has tapered and threaded inner side walls to receive the tapered and threaded base portion 30 of a frame or support 31 of a sprinkler head on which the heat-releasable parts of my invention are assembled.

A plunger 32 is mounted in an opening or orifice 33 in the base 30 and is provided with a coil spring 35 interposed between a shoulder 36 on the plunger 32 and the bottom of the cup-shaped member 23. A cap 38 is held against the open lower end of the base 30 by a post 40, a lever 41, a locking member formed in two parts 43 and 44 and a clamping stud 45, which parts constitute parts of the heat-responsive device of the sprinkler head.

The post 40 is interposed between the outer end of the cap 38 and the shorter end of the lever 41. The lever 41 is pivoted to an intermediate point on the inner end of the clamping stud 45 and is provided with a recess 46 to receive one end of the locking member 43. The second locking member 44 is interposed between a shoulder 47 on the member 43 and a shoulder 48 on the foot of the post 40. The parts 43 and 44 are normally secured in assembled relation by a portion of low melting fusible alloy or solder 49.

Figure 2:
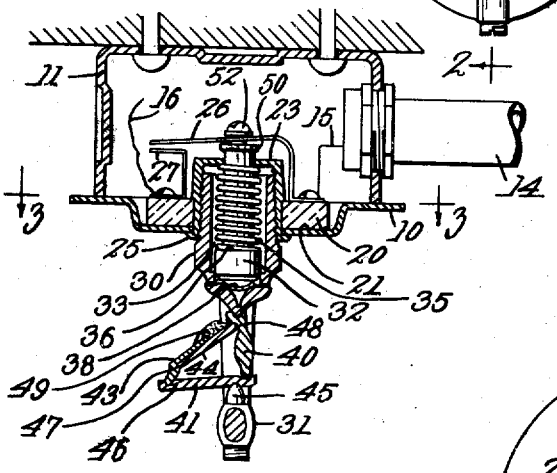
Fig. 2 is a sectional elevation thereof, taken along the line 2—2 in Fig. 1.
Figure 3:
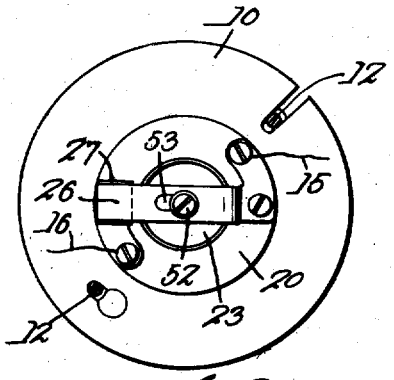
Fig. 3 is a plan view of the cover and parts supported thereby, taken along the line 3—3 in Fig. 2.

When the parts are assembled as shown in Fig. 2 and pressure is applied by the clamping stud 45, the cap 38 is pressed firmly against the open end of the base 30, forcing the plunger 32 inward and compressing the spring 35.

A double-flanged two-part insulating bushing 50 is inserted in an opening or slot 53 in the contact member 26 and is secured to the end of the plunger 32 by a binding screw 52.

When the parts are assembled, the inner flange of the bushing 50 engages the contact member 26 and holds it spaced from the contact member 27. At this time the spring 35 is held compressed by the position of the cap 38 on the end of the base 30 over the orifice 33. If the temperature of the atmosphere surrounding the control device rises above a predetermined point, the solder 49 will melt, allowing the two parts 43 and 44 of the locking member to be swung apart and separate by the pressure of the spring 35, thus releasing the cap 38 and allowing the plunger 32 to be moved by the spring 35 to the position shown in Fig. 4, with the contact members 26 and 27 engaging each other to complete the alarm circuit.

The composition of the low-melting alloy or solder 49 may be varied so that the device will respond to any selected temperature within a considerable range.

From the above description, it will be evident that each control device is a separate unit adapted to be readily connected into a signal system wherever a junction box is installed.

When used in an open circuit system with the contact members 26 and 27 normally separated, as shown in Fig. 2, the several control devices will be connected in parallel, so that the closing of the circuit at any one of the devices will cause the alarm to sound.

Figure 4A:
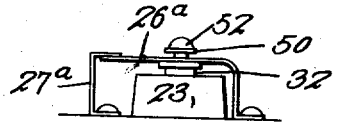
Fig. 4a shows a slight modification of the contact members.
Figure 4:
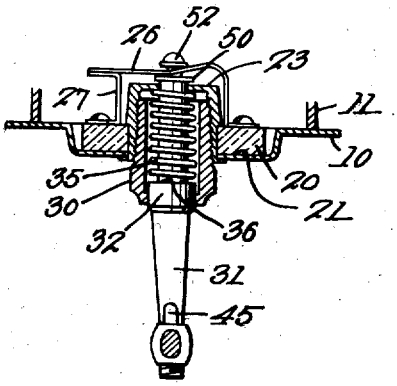
Fig. 4 is a sectional view similar to Fig. 2 but showing the parts released.

The device may be readily adapted for use on a closed circuit system by a slight change in the arrangement of the contact members, as indicated at 26[a] and 27[a] in Fig. 4[a], in which case the control devices will be installed in series, so that the opening of the circuit at any one of a number of different control points will cause the alarm to sound.

In Figs. 5 to 9 I have shown a modified construction which is particularly adapted for use on ship-board or in any other places where head-room is limited. In this form of my invention, I provide a casing 60 having a removable cover plate 61.

A block 62 of insulating material is recessed at 63 to receive an internally threaded cupped-shaped member or metal socket 64 which may be secured therein by screws 65. The outer end of the socket 64 extends through an opening in the cover plate 61 and is flanged outwardly over the cover plate to firmly secure the block 62 and socket 64 in position on the cover plate.

The block 62 is also provided with a second recess 66 and with a passage 67 connecting the recesses 63 and 66. Terminals or contact points 68 and 69 are mounted in the partition which separates the recesses 63 and 66 and are provided with binding screws 70 to which the wires of a signal circuit may be connected.

A contact plate 72 is loosely mounted on the inner end of a plunger 74 but is fully insulated therefrom. The plunger 74 is provided with an insulating sleeve 76, slidable in the opening 67 previously described. A coil spring 77 tends to move the plunger outwardly in the socket 64 and to seat the contact plate 72 against the contact points 68 and 69, thus completing an alarm circuit.

The socket 64 is threaded to receive the base of a heat-controlled releasing mechanism, or sprinkler head, which may be identical in construction with the mechanism previously described in connection with Figs. 1 to 4.

Figure 7:
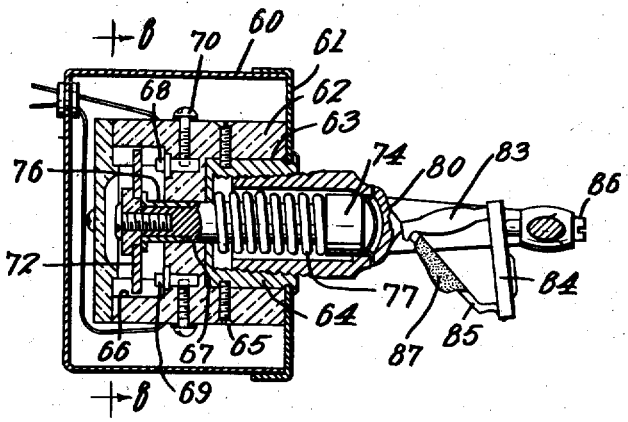
Fig. 7 is a sectional side elevation, taken along the line 7—7 in Fig. 6.

This mechanism or head includes a cap 80 engaging the outer end of the plunger 74 and holding it normally in the inoperative position indicated in Fig. 7.

The cap 80 is held in position by a post 83, lever 84, locking member 85 and adjusting stud 86, all as previously described. The locking member 85 is preferably formed in two separate pieces, secured together by a portion of low melting solder 87.

When pressure is applied by the stud 86, the cap 82 is pressed against the base 80 and plunger 74, and all parts are securely held in this position until a rise in temperature above a predetermined point melts the solder 87, allowing the two parts of the locking member 85 to separate. Such separation causes displacement of the lever 84 and post 83, whereupon the spring 77 pushes the plunger 74 outward through the base 80 and moves the contact plate 72 into position to complete the circuit between the contact points 68 and 69.

I have thus provided a very simple and compact circuit-closing construction, which takes up very little room and which may be conveniently used where space is at a premium.

Figure 9:
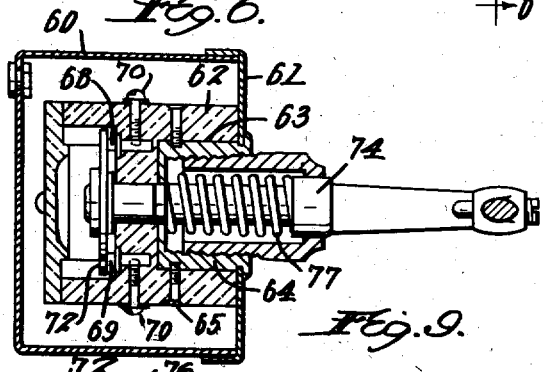
Fig. 9 is a sectional elevation similar to Fig. 7 but showing the parts in a different position.
Figure 8:
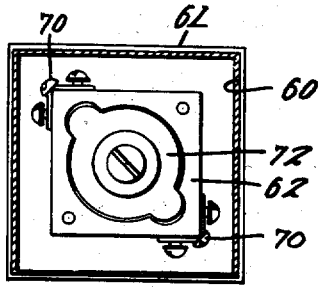
Fig. 8 is a transverse sectional view, taken along the line 8—8 in Fig. 7.
Figure 9A:
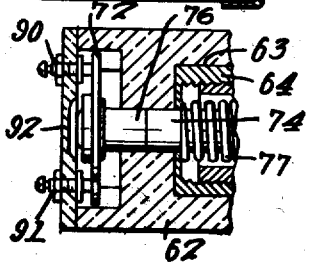
Fig. 9a shows a modified arrangement of the contact members.

If the device is to be used on a closed circuit system, the construction is slightly modified as shown in Fig. 9[a]. This modification consists primarily in mounting the terminals 90 and 91 in a cover plate 92 on the block 62, instead of mounting them in the partition between the recesses 63 and 66, as previously described.

With this construction, the contact plate 72 engages the terminals 90 and 91 when the plunger 74 is forced inward by assembly of the parts. When the parts are released by a rise in temperature above a predetermined point, the plate 72 moves away from the terminals 90 and 91, thus breaking the circuit and sounding the alarm, instead of closing the circuit for this purpose as in the form previously described.

This construction possesses many of the advantages of the construction shown in Figs. 1 to 4 and also requires substantially less head-room when used on ship-board or any places where head-room is limited.

Figure 5:
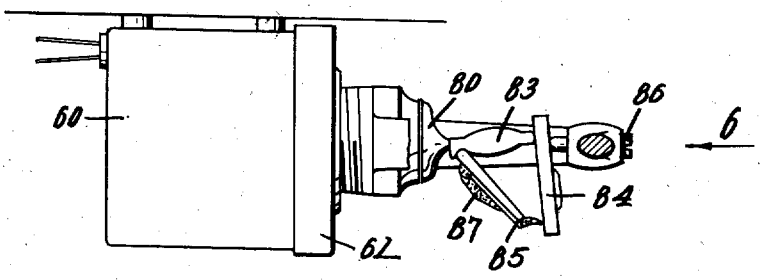
Fig. 5 is a side elevation of a modified construction.
Figure 6:
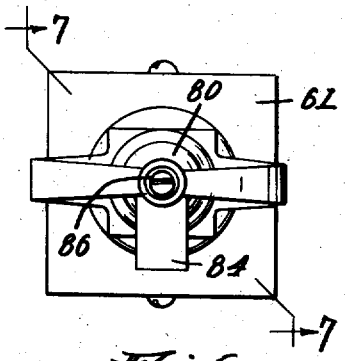
Fig. 6 is an end view, looking in the direction of the arrow 6 in Fig. 5.

The frame 31, the cap 38, the post 41 and the locking members 43, 44 of Figs. 1 and 2, and the equivalent parts of Figs. 5 and 7, comprise an old and thoroughly reliable type of sprinkler head, well known as the "Rockwood" sprinkler head, used in automatic sprinkler systems for liberating a discharge of water from the water pipe of the sprinkler system when subjected to an excessive temperature. When used in a water sprinkler system, the cap 38 closes the passage or orifice 33 against the escape of water from the water pipe until released by the operation of the heat-responsive mechanism, whereas, in my invention as herein illustrated, the cap 38 holds the controller-operating plunger 32 against the pressure of its spring.

In general it is within the scope of my invention to utilize any standard sprinkler head, by which is meant one that has been accepted by the fire underwriters as being reliable for automatic sprinkler systems, and that has the base portion 30, the water passage 33, the cap 38 normally closing the passage and the heat-responsive means for holding the cap in sealing relation with the water passage.

The use of such a sprinkler head is advantageous in many respects. The sprinkler head, per se, is well known to be reliable and hence gives immediate assurance of the reliability of my invention. The sprinkler head can be used indiscriminately in my invention and in an automatic sprinkler system. Hence a fire department does not need to carry any special type of sprinkler head to recondition not only the sprinkler system but also the alarm systems having my invention in its district, it being merely necessary to unscrew the frame member 31 and discard it and replace it by a new head. It is not essential that the replacement head be a "Rockwood" head as a different make can be installed, since all commonly used heads are intended to be screwed into the same diameter pipe opening and have orifices closed by cap 38.

Having thus described my invention and the advantages thereof, I do not wish to be limited to the details herein disclosed, otherwise than as set forth in the claims, but what I claim is:—

1. A control device to be supported by a junction box having a cover plate with an opening therethrough, said control device comprising a ring of non-conducting material aligned with said opening, a cup-shaped member extending through said ring and said opening and securing said ring and plate together, contact members mounted on said ring and at opposite sides of the opening therein, with one of said members extending outside of and across the bottom of said cup-shaped member, a plunger extending through said cup and having a bearing in the inner end of said cup, said plunger engaging said contact member, and means acting normally to force said plunger against said contact member and to thereby hold said contact members in a predetermined relation.

2. A control device to be supported by a junction box having a cover plate with an opening therethrough, said control device comprising a ring of non-conducting material aligned with said opening, a cup-shaped member extending through said ring and said opening and securing said ring and plate together, contact members mounted on said ring and at opposite sides of the opening therein, with one of said members extending outside of and across the bottom of said cup-shaped member, a plunger extending through said cup and engaging said contact member, and means acting normally to force said plunger against said contact member and to thereby hold said contact members in a predetermined relation, said latter means comprising heat releasable elements restraining said plunger and adapted to free said plunger when the temperature of the surrounding atmosphere reaches a predetermined point.

3. The combination in a control device as set forth in claim 2, in which the base portion of a supporting frame is secured in said cup-shaped member, with said plunger extending through an opening in said base portion, and said heat-releasable elements being mounted in and supported by said frame.

4. The combination in a control device as set forth in claim 2, in which the base portion of a supporting frame is secured in said cup-shaped member, with said plunger extending through an opening in said base portion, and said heat-releasable elements including a two-piece locking member mounted in and supported by an open portion of said frame and being fully exposed to changes in surrounding atmospheric conditions, the two parts of said locking member being held together by fusible solder.

5. A control device comprising a casing, a cup-shaped member secured in said casing, said member being internally threaded and having an axial opening through the bottom thereof, contact members mounted in said casing and insulated from each other, an open frame member having a base portion fitting said threaded cup and having an axial opening, a plunger slidable in said opening and engaging one of said contact members to hold said member in a predetermined relation with respect to the second contact member, means to move said plunger, and heat-releasable means to restrain such movement until the temperature of the surrounding atmosphere exceeds a predetermined limit.

6. The combination in a control device as set forth in claim 5, in which means is provided for positively connecting said plunger to its associated contact member.

7. The combination in a control device as set forth in claim 5, in which means is provided for positively connecting said plunger to its associated contact member and in which additional means is provided for preventing movement of the second contact member when engaged by the first contact member.

8. The combination in a control device as set forth in claim 5, in which said plunger is made of non-conducting material, and in which said plunger-moving means comprises a spring surrounding said plunger and housed in the base portion of said open frame member.

9. A control device comprising a casing having a removable cover, a piece of insulating material mounted on said cover, contact members secured to said insulating material, a plunger slidable in said piece of insulating material, a contact plate mounted on said plunger, a spring tending to move said plunger axially and to thereby change the relation of said plate to said contact members, and heat-releasable elements restraining movement of said plunger by said spring, said elements including a member having parts thereof secured together by solder and separable upon an excessive rise in temperature said contact plate being insulated from said plunger and being effective to complete a circuit between said contact members when in engagement therewith.

10. The combination in a control device as set forth in claim 9, in which the piece of insulating material is secured to the removable cover by an internally threaded socket secured in said piece of material and also secured in an opening in said removable cover, and which said heat-releasable elements are mounted on a base threaded into said socket and supported thereby and within which base said plunger is slidable.

11. An alarm signal initiating device comprising, in combination with a sprinkler head including a screw-threaded frame having an orifice, a cap for closing said orifice, and heat-responsive cap-clamping means for holding said cap releasably upon the orifice, of a casing having a screw-threaded opening in which said frame is screwed, and a circuit controller within said casing having operating means therefor governed by said cap.

12. An alarm signal initiating device comprising, in combination with a sprinkler head including a screw-threaded frame having an orifice, a cap for closing said orifice, and heat-responsive cap-clamping means for holding said cap releasably upon the orifice, of a casing having a screw-threaded opening in which said frame is screwed, a circuit controller within said casing, and operating mechanism for said controller having a movable part associated with and normally restrained from movement by said cap.

13. An alarm signal initiating device comprising, in combination with a sprinkler head including a screw-threaded frame having an orifice, a cap for closing said orifice, and heat-responsive cap-clamping means for holding said cap releasably upon the orifice, of a casing having a screw-threaded opening in which said frame is screwed, a circuit controller within said casing, and operating mechanism for said controller having an operating part engaged with said cap and normally held from operation thereby.

14. An alarm signal initiating device comprising, in combination with a sprinkler head including a screw-threaded frame having an orifice, a cap for closing said orifice, and heat-responsive cap-clamping means for holding said cap releasably upon the orifice, of a casing having a screw-threaded opening in which said frame is screwed, a circuit controller within said casing, and operating mechanism for said controller having a plunger bearing against said cap within said orifice, and spring means acting on said plunger in a direction to urge said cap off said orifice.

15. An alarm signal initiating device comprising, in combination with a sprinkler head including a frame having an orifice, a cap for closing said orifice, and heat-responsive cap-clamping means for holding said cap releasably on said orifice, an enclosing casing carrying said head, a circuit controller in said casing governed by said cap.

16. An alarm signal initiating device comprising, in combination with a sprinkler head including a frame having an orifice, a cap for closing said orifice, and heat-responsive cap-clamping means for holding said cap releasably on said orifice, an enclosing casing carrying said head, a circuit controller in said casing having operating mechanism therefor including an operating member located in said orifice and bearing against said cap, and means urging said member for movement outwardly of said orifice.

17. An alarm signal initiating device comprising a frame having an orifice, a cap seated on said orifice, heat-responsive means located on one side of said cap normally holding said cap releasably in the aforesaid relation, spring means acting on the other side of said cap to force it against said heat-responsive means and to dislodge said cap when released by said heat-responsive means, and a circuit controller responsive to the operation of said spring means.

18. An alarm signal initiating device comprising a frame having an orifice, a cap seated on said frame over said orifice, heat-responsive means located on one side of said cap normally holding said cap releasably in the aforesaid relation, a circuit controller, operating mechanism therefor having a part bearing against the other side of said cap, and means urging said part for movement in a direction to dislodge said cap from said orifice.

19. An alarm signal initiating device comprising a frame having an orifice, a cap seated on said frame over said orifice, heat-responsive means located on one side of said cap normally holding said cap releasably in the aforesaid relation, a spring urged member acting against the other side of said cap in a direction to dislodge said cap from said orifice, and a circuit controller operated by said member.

20. An alarm signal initiating device comprising a frame having an orifice, a cap seated on said frame over said orifice, heat-responsive means located on one side of said cap normally holding said cap releasably in the aforesaid relation, a circuit controller, and means located on the other side of said cap and responsive to the dislodgment of said cap from said orifice for effecting operation of said circuit controller.

21. An alarm signal initiating device comprising a frame having an orifice, a cap seated on said frame over said orifice, heat-responsive means located on one side of said cap normally holding said cap releasably in the aforesaid relation, spring-means acting on the other side of said cap in a direction to dislodge it from said orifice, and a circuit controller responsive to the dislodgement of said cap.

22. An alarm signal initiating device comprising a frame having a screw-threaded base provided with an orifice, a cap normally seated on said base and orifice, heat-responsive means holding said cap releasably in the aforesaid relation, a circuit controller, a plunger having an operative connection with said controller movable axially in said base, and spring means acting on said plunger holding it against said cap and exerting a dislodging pressure on said cap.

23. An alarm signal initiating device comprising a frame having a screw-threaded base provided with an orifice, a cap normally seated on said base and orifice, heat-responsive means holding said cap releasably in the aforesaid relation, a circuit controller, a plunger having an operative connection with said controller movable axially in said base, and a spring encircling said plunger within said orifice and holding said plunger forcibly against said cap whereby to dislodge it and move said plunger in a controller-operating direction upon actuation of said heat-responsive means.

24. An alarm signal initiating device comprising a conventional sprinkler head of the type adapted to control the flow of water from the outlet of the water pipe of an automatic water sprinkler system, said sprinkler head having a part adapted to be secured to the water pipe of the sprinkler system and having a water outlet, a valve member which normally closes said outlet, and heat responsive means for holding said valve member in closing relation, in combination with a casing having a part that receives the aforementioned part of said conventional sprinkler head, and a circuit-controller operating member in said casing engaged with said valve member and normally held in an unoperated position thereby and movable into an operated position upon displacement of said valve member.

25. An alarm signal initiating device comprising an enclosing casing having an opening, a cover removably seated on said casing and closing said opening, heat responsive means exteriorly of said casing and bearing against the outer side of said cover for releasably holding the cover in the aforesaid relation, a circuit controller operating member disposed within the casing and bearing against the inner side of said cover, and a circuit controller controlled by said operating member and movable in a circuit controlling direction upon release of said cover.

26. An alarm signal initiating device comprising a conventional sprinkler head having a valve member adapted to be unseated by the pressure of water on one side thereof, and heat responsive means for releasably holding said valve member upon its seat, in combination with a circuit controller structurally independent of said sprinkler head having circuit making and breaking contact members, movable means controlling said contact members normally held in inoperative position by said valve member, and means for moving said movable means in a contact member operating direction upon release of said valve member by said heat responsive means.

27. An alarm signal initiating device comprising a conventional sprinkler head of the type common in the art for effecting the discharge of water into the fire zone upon the occurrence of an abnormal temperature rise in said zone, said head having a normally seated valve member and heat responsive means releasably holding said valve member on its seat against fluid pressure thereon, in combination therewith, a circuit controller the operation of which is governed by said head, said circuit controller including a pressure-urged member which bears upon said valve member in the direction of water pressure thereon, and circuit making and breaking contacts controlled by said pressure urged member.

28. An alarm signal initiating device comprising a casing having an opening, a cover for said opening, a cup-shaped member extended through an opening in said cover and having a flange at its outer end overlying the outer face of said cover, an insulating ring surrounding said member and overlying the inner face of said cover, means on said cup member for clamping said ring against said cover, cooperating contact members carried by said ring, a plunger extended into said cup member and having a connection with a contact member for operating it, a spring acting on said plunger tending to move it outwardly of said cup member and effect the operation of said contact member, a frame member screw-threaded in said cup member and having a passage therethrough in which said plunger is movable axially, a cap on said frame member removably closing the outer end of said passage and engaged with said plunger for holding it from movement, and heat responsive means releasably holding said cap upon said frame member against the force of said spring.

29. An alarm signal initiating device including a duct, a controller mounted in said duct and involving a part urged for predetermined movement, and a sprinkler head removably screwed into said duct and supported thereby independently of said controller and having a heat-released duct-closing cap situated in the path and for restraint of the urged movement of said controller part whereby release of said cap opens said duct to permit such movement.

30. An alarm signal initiating device comprising a conventional sprinkler head having an operable part and of the type designed for use in protective water sprinkler systems, a circuit controller having an operable part engaged with and normally restrained from operation by said operable part of said head, said head being a structural unit independent of said controller, and a support for said controller involving means engaged by said head for supporting said head separately and independently of and removably in restraining relation with said controller.

CLIFTON P. HOWARD.